US009971591B2

(12) United States Patent
Tian et al.

(10) Patent No.: US 9,971,591 B2
(45) Date of Patent: *May 15, 2018

(54) MOBILE TERMINAL, POWER ADAPTER, AND UPGRADE METHOD THEREOF

(71) Applicant: Guangdong Oppo Mobile Telecommunications Corp., Ltd., Dongguan (CN)

(72) Inventors: Chen Tian, Dongguan (CN); Jialiang Zhang, Dongguan (CN); Jun Zhang, Dongguan (CN)

(73) Assignee: Guangdong Oppo Mobile Telecommunications Corp., Ltd., Dongguan (CN)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/311,593

(22) PCT Filed: Sep. 24, 2015

(86) PCT No.: PCT/CN2015/090618
§ 371 (c)(1),
(2) Date: Nov. 16, 2016

(87) PCT Pub. No.: WO2017/049549
PCT Pub. Date: Mar. 30, 2017

(65) Prior Publication Data
US 2017/0308374 A1 Oct. 26, 2017

(51) Int. Cl.
G06F 13/10 (2006.01)
G06F 9/445 (2018.01)
(Continued)

(52) U.S. Cl.
CPC ............ G06F 8/656 (2018.02); G06F 1/3243 (2013.01); G06F 1/3287 (2013.01); G06F 8/67 (2013.01);
(Continued)

(58) Field of Classification Search
None
See application file for complete search history.

(56) References Cited

U.S. PATENT DOCUMENTS

| 2007/0214236 A1* | 9/2007 | Nakano | G03G 15/5075 709/217 |
| 2009/0144455 A1* | 6/2009 | Chen | G06F 11/1433 710/8 |
| 2016/0323980 A1* | 11/2016 | Weber | H04L 12/00 |

FOREIGN PATENT DOCUMENTS

CN 104239097 12/2014

* cited by examiner

Primary Examiner — Chuck Kendall

(57) ABSTRACT

A mobile terminal, a power adapter, and an upgrade method are disclosed. The method includes: downloading upgrade information of the power adapter by a mobile terminal, the upgrade information being upgrade firmware of the power adapter; and transmitting the upgrade information to a processor of the power adapter by the mobile terminal through a data line in a charging port when the mobile terminal is electrically coupled to the power adapter through the charging port to facilitate the processor to upgrade the firmware of the power adapter according to the upgrade information. The mobile terminal downloads the upgrade information, and the most updated upgrade information is transmitted to the power adapter during the process that the mobile terminal connects to the power adapter, the power adapter is upgraded to solve the problem that the power adapter is difficult to upgrade.

20 Claims, 5 Drawing Sheets

(51) Int. Cl.
*G06F 1/32* (2006.01)
*G06F 13/38* (2006.01)
*G06F 13/40* (2006.01)
*G06F 13/42* (2006.01)
*H04L 29/08* (2006.01)
*H04W 88/02* (2009.01)

(52) U.S. Cl.
CPC .............. *G06F 9/445* (2013.01); *G06F 13/10* (2013.01); *G06F 13/385* (2013.01); *G06F 13/4022* (2013.01); *G06F 13/4282* (2013.01); *H04L 67/34* (2013.01); *H04W 88/02* (2013.01)

MOBILE TERMINAL, POWER ADAPTER, AND UPGRADE METHOD THEREOF

RELATED APPLICATION

This application is a National Phase of PCT Patent Application No. PCT/CN2015/090618 having International filing date of Sep. 24, 2015, the contents of which is incorporated by reference as if fully set forth herein in its entirety.

FIELD AND BACKGROUND OF THE INVENTION

The present disclosure relates to a mobile terminal, and more particularly, to a mobile terminal, a power adapter, and an upgrade method thereof.

Nowadays, in order to meet fast charging requirements, power adapters of some mobile terminal (such as a cell phone) manufacturers are designed to be intelligent power adapters. Take the quick charging technology of OPPO Mobile Communications Co., Ltd. for example, a main control module of the power adapter is a microcontroller unit (MCU). Under control of the MCU, the OPPO power adapter can adjust its own operation mode according to a current state.

As is known to all, the MCU is programmable. That is, the MCU is able to achieve different functions via upgrading firmware thereof, and only those MCUs with newly upgraded firmware can implement new functions. Hence, in order to improve performance of the MCU, upgrade information for upgrading firmware of the MCU needs to be timely and conveniently downloaded to the power adapter.

Currently, upgrading firmware of the adapter is performed on a production line. If the upgrade information downloaded is found to have a bug after the power adapter is sold, the adapter needs to be re-upgraded. Or, if a new function is needed to add to improve performance of the power adapters, then the power adapters that have been sold need to be recalled by the manufacturer which wastes time and manpower. Therefore, these problems need to be solved.

SUMMARY OF THE INVENTION

Embodiments of the present disclosure provide a mobile terminal, a power adapter and an upgrade method thereof to solve the problem that the power adapter is difficult to upgrade.

In a first aspect, a method of upgrading a power adapter is provided. The method includes: downloading upgrade information of the power adapter by a mobile terminal, the upgrade information being configured to upgrade firmware of the power adapter; and transmitting the upgrade information to a processor of the power adapter by the mobile terminal through a data line in a charging port when the mobile terminal is connected to the power adapter through the charging port to facilitate the processor to upgrade the firmware of the power adapter according to the upgrade information.

According to an embodiment in conjunction to the first aspect of the present disclosure, the mobile terminal transmits the upgrade information to the processor of the power adapter through the data line in the charging port includes: converting the upgrade information to data in accordance with a Universal Asynchronous Receiver/Transmitter (UART) format by the mobile terminal; and transmitting the data in accordance with UART format to a UART port of the processor of the power adapter by the mobile terminal through the data line in the charging port.

According to an embodiment in conjunction to the first aspect of the present disclosure, the mobile terminal converts the upgrade information into the data in the UART format includes: converting downloaded upgrade information into the data in the UART format by an AP of the mobile terminal; and utilizing the UART port of the AP by the AP of the mobile terminal to transmit the data in the UART format to the UART port of the processor of the power adapter.

According to an embodiment in conjunction to the first aspect of the present disclosure, the method further includes: communicating with the processor of the power adapter by an MCU of the mobile terminal through a first data transmission link to determine whether the firmware of the processor of the power adapter needs to be upgraded, wherein the first data transmission link connects the MCU of the mobile terminal and the charging port; utilizing the UART port of the AP by the AP of the mobile terminal to transmit the data in the UART format to the UART port of the processor of the power adapter including: switching the mobile terminal to a second data transmission link through a USB switch in the mobile terminal when determining that the firmware of the processor of the power adapter needs to be upgraded, and utilizing the UART port of the AP to transmit the data in the UART format to the UART port of the processor of the power adapter through the second data transmission link, wherein the second data transmission link connects the UART port of the AP to the charging port.

According to an embodiment in conjunction to the first aspect of the present disclosure, the method further includes: determining whether a power supply device plugged in is the power adapter by the AP of the mobile terminal through a third data transmission link, wherein the third data transmission link connects a USB port of the AP and the charging port; communicating with the processor of the power adapter by the MCU of the mobile terminal through the first data transmission link to determine whether the firmware of the processor of the power adapter needs to be upgraded including: switching the mobile terminal to the first data transmission link through the USB switch in the mobile terminal when the MCU of the mobile terminal determines that the power supply device plugged in is the power adapter, communicating with the processor of the power adapter through the MCU of the mobile terminal to determine whether the firmware of the processor of the power adapter needs to be upgraded.

According to an embodiment in conjunction to the first aspect of the present disclosure, the method further includes transmitting a handshake request message to the power adapter by the MCU of the mobile terminal, the handshake request message being configured to enquire about a current version of the firmware of the power adapter; receiving a handshake response message fed back from the power adapter by the MCU of the mobile terminal, the handshake response message including a message indicating the current version of the firmware of the power adapter; and determining whether the firmware currently used by the power adapter needs to be upgraded by the MCU of the mobile terminal according to the current version of the firmware of the power adapter and a latest updated version indicated by the downloaded upgrade information; transmitting the data in accordance with UART format to the UART port of the processor of the power adapter by the MCU of the mobile terminal through the data line in the charging port including: transmitting the data in accordance with UART format to the UART port of the processor of the power adapter by the MCU of the mobile terminal through the data line in the charging port when determining that the firmware currently used by the power adapter needs to be upgraded.

According to an embodiment in conjunction to the first aspect of the present disclosure, the method further includes determining whether a power supply device plugged in is the power adapter by the AP of the mobile terminal through a first data transmission link, wherein the first data transmission link connects a Universal Serial Bus (USB) port of the AP and the charging port; and switching the mobile terminal from the first data transmission link to a second data transmission link through the USB switch when determining that the power supply device plugged in is the power adapter, wherein the second data transmission link connects the MCU of the mobile terminal and the charging port; transmitting the data in accordance with UART format to the UART port of the processor of the power adapter by the MCU of the mobile terminal through the data line in the charging port including: transmitting the data in accordance with UART format to the UART port of the processor of the power adapter by the MCU of the mobile terminal through the second data transmission link.

According to an embodiment in conjunction to the first aspect of the present disclosure, the upgrade information is information downloaded from network by the AP in the mobile terminal through a radio frequency controller.

According to an embodiment in conjunction to the first aspect of the present disclosure, the mobile terminal transmits the upgrade information to the processor of the power adapter through the data line in the charging port during the process that the mobile terminal is electrically coupled to the power adapter through the charging port includes: transmitting the upgrade information to the processor of the power adapter by the mobile terminal through the data line in the charging port when the power adapter uses a normal charging mode to charge the mobile terminal. The method further includes: switching the mobile terminal from the normal charging mode to a fast charging mode after the power adapter upgrades the firmware of the power adapter according to the upgrade information, wherein a charge rate of the fast charging mode is greater than a charge rate of the normal charging mode.

According to an embodiment in conjunction to the first aspect of the present disclosure, the charging port is the USB port, the data line in the charging port is at least one of D+ line and D− line in the USB port.

In a second aspect, a method of upgrading a power adapter is provided. The method includes: receiving upgrade information of the power adapter from a mobile terminal by the power adapter through a data line in a charging port when the power adapter is electrically coupled to the mobile terminal through the charging port; and upgrading firmware of the power adapter by a processor of the power adapter according to the upgrade information.

According to an embodiment in conjunction to the second aspect of the present disclosure, the power adapter receives the upgrade information of the power adapter from the mobile terminal through the data line in the charging port includes: receiving data in accordance with a Universal Asynchronous Receiver/Transmitter (UART) format transmitted by the mobile terminal by the power adapter through a UART port of the processor, wherein the data in accordance with UART format is formed by converting the upgrade information by the mobile terminal.

According to an embodiment in conjunction to the second aspect of the present disclosure, receiving the data in the UART format transmitted by the mobile terminal by the power adapter through the UART port of the processor includes: receiving the data in the UART format transmitted from a UART port of an AP of the mobile terminal by the power adapter through the UART port of the processor.

According to an embodiment in conjunction to the second aspect of the present disclosure, the upgrade information is information downloaded from network by the AP in the mobile terminal through a radio frequency controller.

According to an embodiment in conjunction to the second aspect of the present disclosure, the method further includes: receiving a handshake request message from the mobile terminal by the power adapter, the handshake request message being configured to enquire about a current version of the firmware of the power adapter; and transmitting a handshake response message to the mobile terminal by the power adapter, the handshake response message including a message indicating the current version of the firmware of the power adapter; receiving the upgrade information of the power adapter from the mobile terminal by the power adapter including: receiving the upgrade information of the power adapter from the mobile terminal by the power adapter when the mobile terminal determines that the firmware currently used by the power adapter needs to be upgraded according to a latest updated version indicated by the upgrade information.

According to an embodiment in conjunction to the second aspect of the present disclosure, the power adapter receives the upgrade information of the power adapter from the mobile terminal through the data line in the charging port during the process that the power adapter is electrically coupled to the mobile terminal through the charging port includes: receiving the upgrade information of the power adapter from the mobile terminal by the power adapter through the data line in the charging port when the power adapter uses a normal charging mode to charge the mobile terminal. The method further includes: switching the power adapter from the normal charging mode to a fast charging mode after the power adapter upgrades the firmware of the power adapter according to the upgrade information, wherein a charge rate of the fast charging mode is greater than a charge rate of the normal charging mode.

According to an embodiment in conjunction to the second aspect of the present disclosure, the charging port is a USB port, the data line in the charging port is at least one of D+ line and D− line in the USB port.

In a third aspect, a mobile terminal is provided. The mobile terminal includes: a download controller configured to download upgrade information of a power adapter, the upgrade information being configured to upgrade firmware of the power adapter; and a first sending controller configured to transmit the upgrade information to a processor of the power adapter through a data line in a charging port when the mobile terminal is electrically coupled to the power adapter through the charging port to facilitate the processor to upgrade the firmware of the power adapter according to the upgrade information.

According to an embodiment in conjunction to the third aspect of the present disclosure, the first sending controller is configured to convert the upgrade information into data in accordance with a Universal Asynchronous Receiver/Transmitter (UART) format; transmit the data in accordance with UART format to a UART port of the processor of the power adapter through the data line in the charging port.

According to an embodiment in conjunction to the third aspect of the present disclosure, the first sending controller is configured to convert downloaded upgrade information into the data in the UART format through an AP of the mobile terminal; utilize a UART port of the AP to transmit the data in the UART format to the UART port of the processor of the power adapter through the AP of the mobile terminal.

According to an embodiment in conjunction to the third aspect of the present disclosure, the mobile terminal further includes: a communication controller configured to communicate with the processor of the power adapter through a first data transmission link to determine whether the firmware of the processor of the power adapter needs to be upgraded, wherein the first data transmission link connects an MCU of the mobile terminal and the charging port; the first sending controller being configured to switch to a second data transmission link through a USB switch in the mobile terminal when determining that the firmware of the processor of the power adapter needs to be upgraded, and utilize the UART port of the AP to transmit the data in the UART format to the UART port of the processor of the power adapter through the second data transmission link, wherein the second data transmission link connects the UART port of the AP and the charging port.

According to an embodiment in conjunction to the third aspect of the present disclosure, the mobile terminal further includes: a judge controller configured to determine whether a power supply device plugged in is the power adapter through a third data transmission link, wherein the third data transmission link connects a USB port of the AP and the charging port; the communication controller being configured to switch to the first data transmission link through the USB switch in the mobile terminal when the MCU of the mobile terminal determines that the power supply device plugged in is the power adapter to communicate with the processor of the power adapter through the MCU of the mobile terminal so as to determine whether the firmware of the processor of the power adapter needs to be upgraded.

According to an embodiment in conjunction to the third aspect of the present disclosure, the upgrade information is information downloaded from network by the AP in the mobile terminal through a radio frequency controller.

According to an embodiment in conjunction to the third aspect of the present disclosure, the first sending controller is configured to transmit the upgrade information to the processor of the power adapter through the data line in the charging port when the power adapter uses a normal charging mode to charge the mobile terminal, the mobile terminal further includes: a switch controller configured to switch the power adapter from the normal charging mode to a fast charging mode when the power adapter completes the firmware upgrade of the power adapter based on the received upgrade information, wherein a charge rate of the battery charged by the power adapter in the normal charging mode is greater than a charge rate of the battery charged by the power adapter in the fast charging mode.

According to an embodiment in conjunction to the third aspect of the present disclosure, the charging port is the USB port, the data line in the charging port is at least one of D+ line and D– line in the USB port.

In a fourth aspect, a power adapter is provided. The power adapter includes: a first receiving controller configured to receive upgrade information of the power adapter from a mobile terminal through a data line in a charging port when the power adapter is electrically coupled to the mobile terminal through the charging port; and an upgrade controller configured to upgrade firmware of the power adapter through the processor of the power adapter according to the upgrade information.

According to an embodiment in conjunction to the fourth aspect of the present disclosure, the first receiving controller is configured to receive data in accordance with a Universal Asynchronous Receiver/Transmitter (UART) format transmitted by the mobile terminal through a UART port of the processor, wherein the data in accordance with UART format is formed by converting the upgrade information by the mobile terminal.

According to an embodiment in conjunction to the fourth aspect of the present disclosure, the first receiving controller is configured to receive the data in the UART format transmitted from a UART port of an application processor (AP) of the mobile terminal through the UART port of the processor.

According to an embodiment in conjunction to the fourth aspect of the present disclosure, the upgrade information is information downloaded from network by the AP in the mobile terminal through a radio frequency controller.

According to an embodiment in conjunction to the fourth aspect of the present disclosure, the power adapter further includes: a second receiving controller configured to receive a handshake request message from the mobile terminal, the handshake request message being configured to enquire about a current version of the firmware of the power adapter; and a sending controller configured to transmit a handshake response message to the mobile terminal, the handshake response message including a message indicating the current version of the firmware of the power adapter. The first receiving controller is configured to receive the upgrade information of the power adapter from the mobile terminal when the mobile terminal determines that the firmware currently used by the power adapter needs to be upgraded according to a latest updated version indicated by the upgrade information.

According to an embodiment in conjunction to the fourth aspect of the present disclosure, the first receiving controller is configured to receive the upgrade information of the power adapter from the mobile terminal by the power adapter through the data line in the charging port when the power adapter uses a normal charging mode to charge the mobile terminal. The power adapter further includes: a switch controller configured to switch the power adapter from the normal charging mode to a fast charging mode when the power adapter completes the firmware upgrade of the power adapter based on the received upgrade information, wherein a charge rate of the battery charged by the power adapter in the normal charging mode is greater than a charge rate of the battery charged by the power adapter in the fast charging mode.

According to an embodiment in conjunction to the fourth aspect of the present disclosure, the charging port is a USB port, the data line in the charging port is at least one of D+ line and D– line in the USB port.

According to the embodiments of the present disclosure, the mobile terminal is utilized to download the upgrade information of the power adapter, and the most updated upgrade information is transmitted to the power adapter during the process that the mobile terminal is electrically coupled to the power adapter, the power adapter is thus upgraded to solve the problem that the power adapter is difficult to upgrade.

BRIEF DESCRIPTION OF THE SEVERAL VIEWS OF THE DRAWINGS

In order to more clearly illustrate the embodiments of the present disclosure or related art, the following figures will be described in the embodiments are briefly introduced. It is obvious that the drawings are merely some embodiments of the present disclosure, those of ordinary skill in this field can obtain other figures according to these figures without paying the premise.

DESCRIPTION OF SPECIFIC EMBODIMENTS OF THE INVENTION

For the purpose of description rather than limitation, the following provides such specific details as a specific system structure, interface, and technology for a thorough understanding of the application. However, it is understandable by persons skilled in the art that the application can also be implemented in other embodiments not providing such specific details. In other cases, details of a well-known apparatus, circuit and method are omitted to avoid hindering the description of the application by unnecessary details.

Current power adapters do not include radio frequency controllers. The current power adapters thus cannot behave like mobile terminals that are able to conveniently download upgrade information through over the air (OTA) technology to be upgraded. Hence, embodiments of the present disclosure utilize the mobile terminal to download upgrade information of the power adapter, and transmit the upgrade information downloaded to the processor of the power adapter through the charging port between the mobile terminal and the power adapter during the process that the mobile terminal is electrically coupled to the power adapter so as to facilitate the processor of the power adapter to upgrade by using the upgrade information. Reference will now be made to the embodiments to describe the upgrade method of the power adapter according to the embodiments of the present disclosure in detail.

Figure 1:
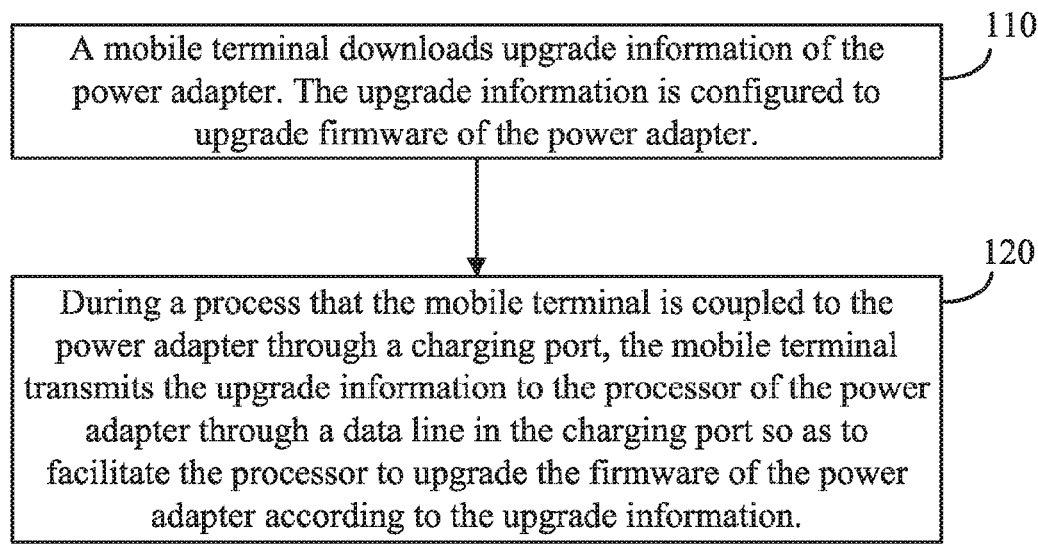
FIG. 1 is a schematic flowchart of an upgrade method of a power adapter according to one embodiment of the present disclosure.

Refer to FIG. 1, FIG. 1 is a schematic flowchart of an upgrade method of a power adapter according to one embodiment of the present disclosure. The method shown in FIG. 1 includes:

Block 110: a mobile terminal downloads upgrade information of the power adapter. The upgrade information is configured to upgrade firmware of the power adapter.

In the embodiment of the present disclosure, the upgrade information of the power adapter is not limited to any specific form. For example, the upgrade information may be firmware of a processor inside the power adapter.

The mobile terminal may be a cell phone, a tablet, etc.

The mobile terminal may include an application processor (AP) and an MCU (such as a baseband processor). The AP of the mobile terminal may take the responsibility of relevant functions of an intelligent terminal, such as downloading and managing applications (APP). The MCU of the mobile terminal may take the responsibility of some basic functions, such as text messaging and calling. The upgrade information may be information downloaded from network by the AP in the mobile terminal through a radio frequency controller. For example, the AP downloads the upgrade information through cellular network or WIFI.

Block 120: when the mobile terminal is electrically coupled to the power adapter through a charging port, the mobile terminal transmits the upgrade information to the processor of the power adapter through a data line in the charging port so as to facilitate the processor to upgrade the firmware of the power adapter according to the upgrade information.

According to the embodiment of the present disclosure, the mobile terminal is utilized to download the upgrade information of the power adapter, and the most updated upgrade information is transmitted to the power adapter during the process that the mobile terminal is electrically coupled to the power adapter. The power adapter is thus upgraded to solve the problem that the power adapter is difficult to upgrade. When the power adapter is found to have a bug, or when the firmware of the adapter is upgraded, there is no need to return the adapter to the manufacturer. Using the mobile terminal to directly download new upgrade information from network will work.

The above charging port may be a universal serial bus (USB) port. The USB port may be a typical USB port, or a micro USB port. The data line in the charging port may be at least one of D+ line and D− line in the USB port.

In addition, the processor in the power adapter is not limited according to the embodiment of the present disclosure. For example, the processor may be some model of MCU.

Currently, in the field of quick charging, the main ports of the processor of the power adapter, such as an Inter-Integrated Circuit (I2C) port, are occupied. These ports respectively have tasks need to be completed or functions need to be achieved. Under normal circumstances, a universal asynchronous receiver/transmitter (UART) port of the processor of the power adapter is not fully utilized. Hence, in order to complete the upgrade of the power adapter, the above upgrade information can be converted into data in UART format, then the UART port of the processor of the power adapter receives the data in accordance with UART format. The method of converting the upgrade information into the data in accordance with UART format is not limited according to the embodiment of the present disclosure. The upgrade information may be converted into the data in accordance with UART format by the mobile terminal, then the mobile terminal transmits the data in accordance with UART format to the UART port of the processor of the power adapter through the data line in the charging port. Conversion of the upgrade information may be completed by the AP of the mobile terminal, or may be completed by the MCU of the mobile terminal. In the following, a detailed description is provided by taking the AP of the mobile terminal to perform conversion of the upgrade information as an example.

Optionally, the mobile terminal converting the upgrade information into the data in the UART format may include: The AP of the mobile terminal converting the downloaded upgrade information into the data in the UART format; the AP of the mobile terminal utilizing the UART port of the AP to transmit the data in the UART format to the UART port of the processor of the power adapter.

The mobile terminal may establish communication links between the UART port, the charging port, and the power adapter so that the above data in the UART format can be directly transmitted to the power adapter without passing the MCU of the cell phone.

According to the embodiment of the present disclosure, the AP of the mobile terminal is utilized to convert the downloaded upgrade information into the data in the UART format, then the data in the UART format is directly transmitted to the UART port of the processor of the power adapter through the UART port of the AP. As a result, the problem that the conventional power adapter does not have sufficient special purpose ports is overcome.

Optionally, the method in FIG. 1 further includes: The MCU of the mobile terminal communicating with the processor of the power adapter through a first data transmission link to determine whether the firmware of the processor of the power adapter needs to be upgraded, wherein the first data transmission link connects the MCU of the mobile terminal and the charging port; the AP of the mobile terminal utilizing the UART port of the AP to transmit the data in the UART format to the UART port of the processor of the power adapter including: The mobile terminal switching to a second data transmission link through the USB switch in the mobile terminal and utilizing the UART port of the AP to transmit the data in the UART format to the UART port of the processor of the power adapter through the second data transmission link when determining that the firmware of the processor of the power adapter needs to be upgraded, wherein the second data transmission link connects the UART port of the AP and the charging port.

Optionally, the method in FIG. 1 may further include: The AP of the mobile terminal determining whether the power supply device plugged in is the power adapter through a third data transmission link, wherein the third data transmission link connects the USB port of the AP and the charging port; the MCU of the mobile terminal communicating with the processor of the power adapter through the first data transmission link to determine whether the firmware of the processor of the power adapter needs to be upgraded including: The mobile terminal switching to the first data transmission link through the USB switch in the mobile terminal to communicate with the processor of the power adapter through the MCU of the mobile terminal so as to determine whether the firmware of the processor of the power adapter needs to be upgraded when the MCU of the mobile terminal determines that the power supply device plugged in is the power adapter.

One or more USB switches may be disposed in the mobile terminal to complete the switching of the above links.

Optionally, the method in FIG. 1 may further include: The mobile terminal transmitting the handshake request message to the power adapter, the handshake request message being configured to enquire about the current version of the firmware of the power adapter; the mobile terminal receiving the handshake response message fed back from the power adapter, the handshake response message including the message indicating the current version of the firmware of the power adapter; the mobile terminal determining whether the firmware currently used by the power adapter needs to be upgraded according to the current version of the firmware of the power adapter and the latest updated version indicated by the downloaded upgrade information; the mobile terminal transmitting the upgrade information to the processor of the power adapter may include: The mobile terminal transmitting the upgrade information to the processor of the power adapter when determining that the firmware currently used by the power adapter needs to be upgraded.

The above handshake process may be performed by the AP of the mobile terminal, or may be performed by the MCU of the mobile terminal. The embodiment of the present disclosure is not limited in this regard. For example, the above step may be performed by the AP. Under the circumstances, the AP can perform the above handshake process with the processor of the power adapter through the MCU of the mobile terminal, or a direct path can be established between the AP and the MCU of the power adapter to complete the handshake process between the AP and the MCU of the power adapter. The USB switch may be disposed inside the mobile terminal to respectively realize communication between the AP of the mobile terminal as well as the MCU of the mobile terminal and the MCU of the power adapter through switching the USB switch.

The method in FIG. 1 further includes: The AP of the mobile terminal determining whether the power supply device plugged in is the power adapter through a first communication link; the mobile terminal transmitting the handshake request message to the power adapter including: The mobile terminal switching to a second communication link through a switch to transmit the handshake request message to the power adapter through the MCU of the mobile terminal when the AP of the mobile terminal determines that the power supply device is the power adapter; wherein the first communication link is configured to communicate between the AP of the mobile terminal and the power adapter, the second communication link is configured to communicate between the MCU of the mobile terminal and the power adapter, the first communication link and the second communication link are switched through the switch inside the mobile terminal.

In block 120, the mobile terminal may transmit the upgrade information to the power adapter during the charging process, or the mobile terminal may transmit the upgrade information to the power adapter before charging or after charging. The embodiment of the present disclosure is not limited in this regard. In the following, an embodiment is provided.

Optionally, block 120 may include: The mobile terminal transmitting the upgrade information to the processor of the power adapter through the data line in the charging port when the power adapter uses a normal charging mode to charge the mobile terminal. The method in FIG. 1 may further include: The mobile terminal switching from the normal charging mode to a fast charging mode after the power adapter upgrades the firmware of the power adapter according to the upgrade information, wherein a charge rate of the fast charging mode is greater than a charge rate of the normal charging mode.

In the embodiment of the present disclosure, the power adapter first uses the normal charging mode to charge the mobile terminal, and the mobile terminal transmits the upgrade information to the power adapter during the normal charging process. After the power adapter completes the upgrade, the normal charging mode is switched to the fast charging mode. In this manner, it is ensured that the power adapter can be upgraded in time and the power adapter always uses the most updated firmware to provide the mobile terminal with the charging service.

Reference will now be made to examples to provide a detailed description of the embodiments of the present disclosure. In the following examples, a mobile terminal is a cell phone. The cell phone includes an AP and an MCU. A processor of the power adapter (hereinafter referred to as an adapter) is an MCU. Upgrade information of the adapter is firmware of the MCU of the adapter. The cell phone downloads the firmware of the MCU of the adapter to the AP through the OTA technology. It should be noted that the examples in FIG. 2 to FIG. 6 are simply for facilitating the understanding of those of ordinary skill in the art, and are not intended to limit the embodiments of the present disclosure. Those of ordinary skill in the art may perform equivalent modifications or variations to the examples shown in FIG. 2 to FIG. 6, and these modifications or variations are within the scope of the embodiments of the present disclosure.

Figure 2:
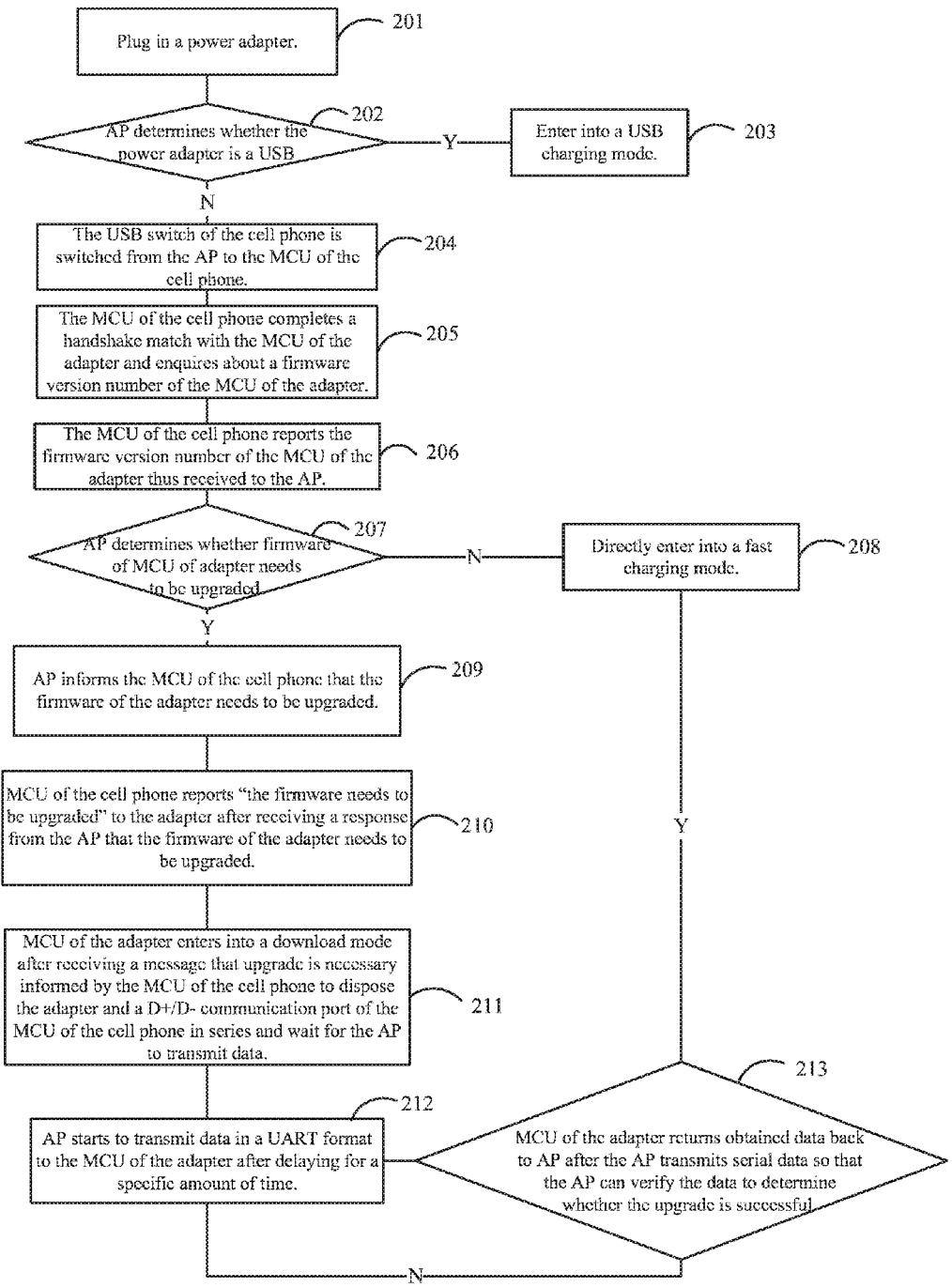
FIG. 2 is a schematic flowchart of an upgrade method of a power adapter according to one embodiment of the present disclosure.

FIG. 2 is a schematic flowchart of an upgrade method of a power adapter according to one embodiment of the present disclosure. The method in FIG. 2 includes:

Block 201: A power supply device is plugged into a cell phone.

Block 202: An AP of the cell phone determines whether the power supply device is an adapter. If the power supply device is not an adapter, go to block 203. If the power supply device is an adapter, go to block 204.

Figure 3:
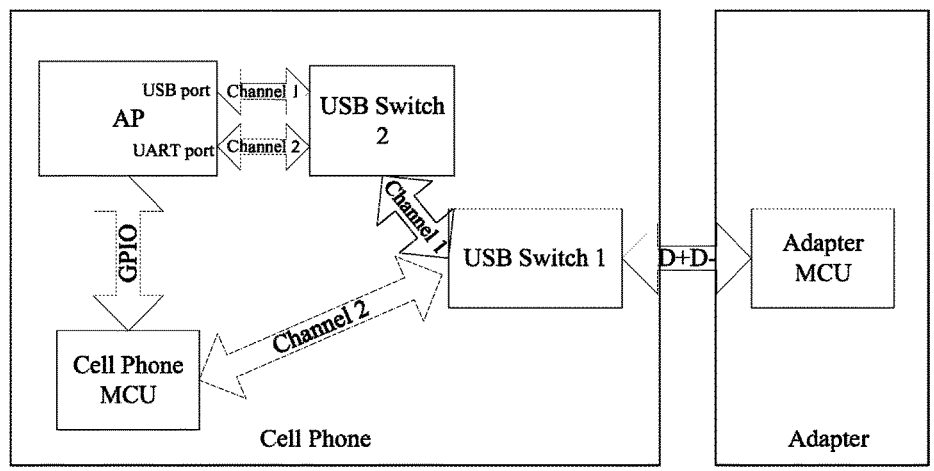
FIG. 3 is a schematic diagram of a system structure of a cell phone and a power adapter according to one embodiment of the present disclosure.
Figure 4:
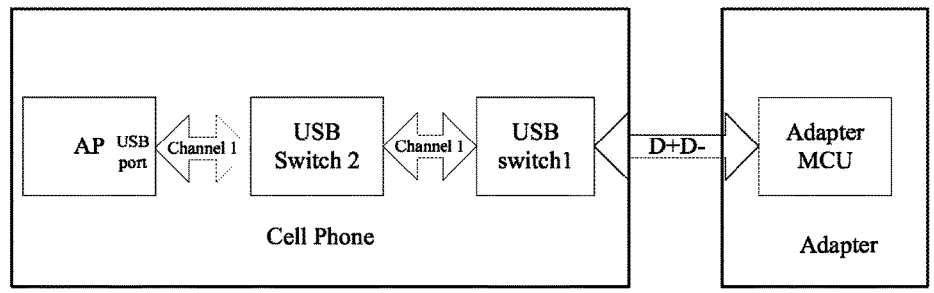
FIG. 4 is a schematic diagram of a communication link between an AP of a cell phone and a power adapter according to one embodiment of the present disclosure.

The cell phone includes the AP and the MCU. Both the AP and the MCU of the cell phone can communicate with the MCU of the adapter. As shown in FIG. 3, two USB switches, a USB switch 1 and a USB switch 2, may be disposed inside the cell phone. The USB switch 1 controls switching of a communication link between the AP of the cell phone and the MCU of the cell phone. The USB switch 2 controls switching between a USB port and a UART port of the AP. A default setting of the USB switch 2 may be channel 1, that is, the USB port. A default setting of the USB switch 1 may be channel 1, that is, a communication link between the AP and the MCU of the adapter. Under the circumstances, the AP of the cell phone can be connected to the D+ line and the D– line through its USB port so as to identify whether the power supply device plugged in is the adapter. The communication link for the AP of the cell phone to identify the adapter is shown in FIG. 4.

Block 203: Enter into a non-adapter charging mode.

For example, the power supply device is a computer. The cell phone is plugged into the computer so that the computer can be utilized to provide the cell phone with power.

Block 204: The USB switch of the cell phone is switched from the AP to the MCU of the cell phone.

Block 205: The MCU of the cell phone completes a handshake match with the MCU of the adapter and enquires about a firmware version number of the MCU of the adapter.

Figure 5:
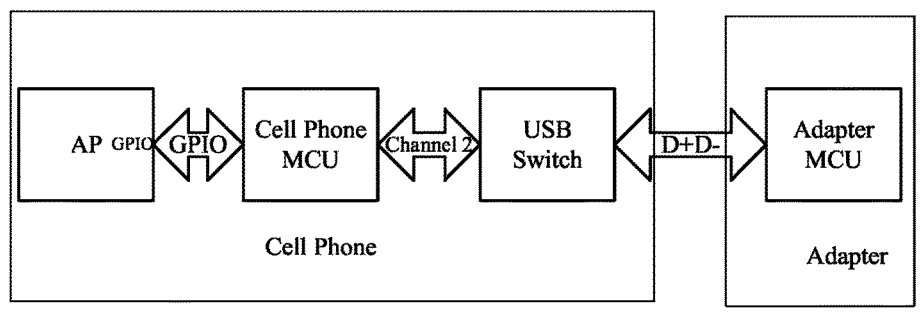
FIG. 5 is a schematic diagram of a communication link between an MCU of a cell phone and a power adapter according to one embodiment of the present disclosure.

A communication link for a handshake negotiation process between the MCU of the cell phone and the adapter may be shown in FIG. 5. Under the circumstances, the setting of the USB switch 1 is channel 2.

Block 206: The MCU of the cell phone reports the firmware version number of the MCU of the adapter thus received to the AP.

Block 207: The AP determines whether firmware of the MCU of the adapter needs to be upgraded. If the firmware of the MCU of the adapter does not need to be upgraded, perform block 208; if the firmware of the MCU of the adapter needs to be upgraded, perform block 209.

Block 208: Directly enter into a fast charging mode.

Block 209: The AP informs the MCU of the cell phone that the firmware of the adapter needs to be upgraded, the AP disposes a GPIO port electrically coupled to the MCU of the cell phone to be a port simulating a UART port.

Block 210: The MCU of the cell phone reports "the firmware needs to be upgraded" to the adapter after receiving a response from the AP that the firmware of the adapter needs to be upgraded, then the MCU of the cell phone is disposed to be in a wire mode.

Figure 6:
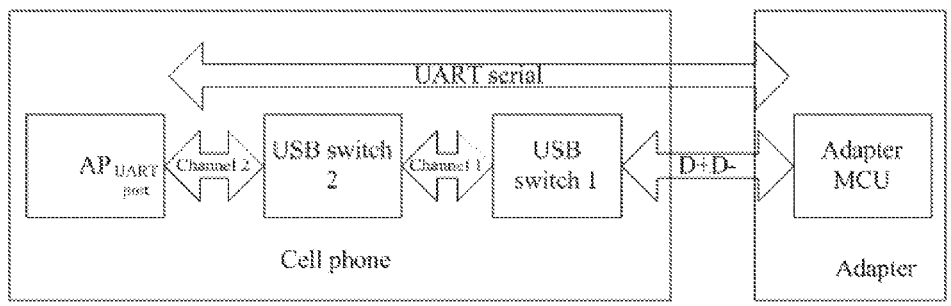
FIG. 6 is a schematic diagram of a data link used by an AP of a cell phone to transmit adapter firmware to a power adapter.

Refer to FIG. 6, FIG. 6 is a communication link between an AP of a cell phone and an MCU of an adapter when upgrading firmware of the adapter, which is equivalent to establishing a UART serial connection between the AP and the MCU of the adapter by using two USB switches.

Block 211: The MCU of the adapter enters into a download mode after receiving a message that upgrade is necessary informed by the MCU of the cell phone to dispose the adapter and a D+/D– communication port of the MCU of the cell phone in series and wait for the AP to transmit data.

Block 212: The AP starts to transmit data in a UART format to the MCU of the adapter after delaying for a specific amount of time.

A delay time may be preset. When the delay time is reached, the AP can regard that both the MCU of the cell phone and the MCU of the adapter are ready and start to transmit the data in accordance with UART format to the MCU of the adapter.

Block 213: The MCU of the adapter returns obtained data back to the AP after the AP transmits serial data so that the AP can verify the data to determine whether the upgrade is successful. If the upgrade is determined to be successful, perform block 208; if the upgrade is determined not to be successful, perform block 212.

In the above, the upgrade method of the power adapter according to the embodiments of the present disclosure is described in detail from the view point of the mobile terminal with reference to FIG. 1. In the following, the upgrade method of the power adapter according to the embodiments of the present disclosure is described from the view point of the power adapter with reference to FIG. 7.

Since the interactions between, relevant features and functions of the power adapter and the mobile terminal from the view point of the mobile terminal correspond to those from the view point of the power adapter, a repeat description is not provided wherever possible to simplify matters.

Figure 7:
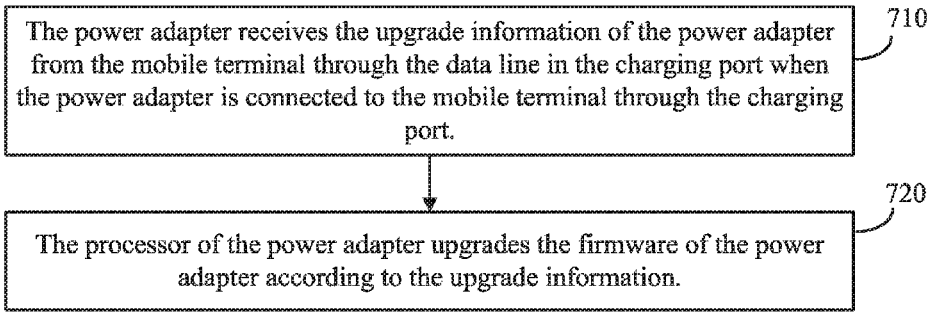
FIG. 7 is a schematic flowchart of an upgrade method of a power adapter according to one embodiment of the present disclosure.

FIG. 7 is a schematic flowchart of an upgrade method of a power adapter according to one embodiment of the present disclosure. The method in FIG. 7 includes:

Block 710: The power adapter receives the upgrade information of the power adapter from the mobile terminal through the data line in the charging port during the process that the power adapter is electrically coupled to the mobile terminal through the charging port.

Block 720: The processor of the power adapter upgrades the firmware of the power adapter according to the upgrade information.

According to the embodiment of the present disclosure, the mobile terminal is utilized to download the upgrade information of the power adapter, and transmit the most updated upgrade information to the power adapter during the process that the mobile terminal is electrically coupled to the power adapter. The power adapter is thus upgraded to resolve the problem that the power adapter is difficult to upgrade.

Optionally, block 710 may include: The power adapter receives the data in accordance with UART format transmitted from the mobile terminal through the UART port of the processor. The data in accordance with UART format is formed by converting the upgrade information by the mobile terminal.

Optionally, the power adapter receives the data in accordance with UART format transmitted from the mobile terminal through the UART port of the processor includes: The power adapter receiving the data in accordance with UART format transmitted from the UART port of the AP of the mobile terminal through the UART port of the processor.

Optionally, the upgrade information is information downloaded from network by the AP in the mobile terminal through the radio frequency controller.

Optionally, the method in FIG. 7 may further include: The power adapter receiving the handshake request message from the mobile terminal, the handshake request message being configured to enquire about the current version of the firmware of the power adapter; the power adapter transmitting the handshake response message to the mobile terminal, the handshake response message including the message indicating the current version of the firmware of the power adapter; the power adapter receiving the upgrade information of the power adapter from the mobile terminal including: The power adapter receiving the upgrade information of the power adapter from the mobile terminal when the mobile terminal determines that the firmware currently used by the power adapter needs to be upgraded according to the latest updated version indicated by the upgrade information.

Optionally, the power adapter receiving the upgrade information of the power adapter from the mobile terminal through the data line in the charging port during the process that the power adapter is electrically coupled to the mobile terminal through the charging port includes: The power adapter receiving the upgrade information of the power adapter from the mobile terminal through the data line in the charging port during the process that the power adapter uses the normal charging mode to charge the mobile terminal; the method further includes: The power adapter switching from the normal charging mode to the fast charging mode after the power adapter upgrades the firmware of the power adapter according to the upgrade information, wherein the charge rate of the fast charging mode is greater than the charge rate of the normal charging mode.

Optionally, the charging port is the USB port. The data line in the charging port is at least one of the D+ line and the D− line in the USB port.

In the above, the upgrade methods of the power adapters according to the embodiments of the present disclosure are described in detail with reference to FIG. 1 to FIG. 7. In the following, the mobile terminals and power adapters according to the embodiments of the present disclosure are described in detail with reference to FIG. 8 to FIG. 11. The mobile terminals and the power adapters in FIG. 8 to FIG. 11 can realize the various steps performed by the mobile terminals and the power adapters shown in FIG. 1 to FIG. 7. A detailed description is not provided to avoid repetition.

Figure 8:
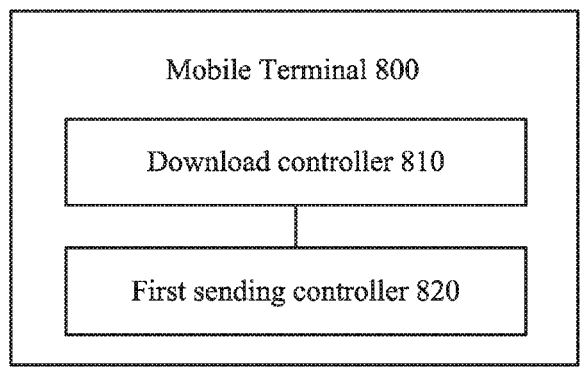
FIG. 8 is a schematic block diagram of a mobile terminal according to one embodiment of the present disclosure.

FIG. 8 is a schematic block diagram of a mobile terminal according to one embodiment of the present disclosure. A mobile terminal 800 in FIG. 8 includes:

A download controller 810 configured to download the upgrade information of the power adapter. The upgrade information is configured to upgrade the firmware of the power adapter.

A first sending controller 820 configured to transmit the upgrade information to the processor of the power adapter through the data line in the charging port during the process that the mobile terminal 800 is electrically coupled to the power adapter through the charging port to facilitate the processor to upgrade the firmware of the power adapter according to the upgrade information.

In the embodiment of the present disclosure, the mobile terminal is utilized to download the upgrade information of the power adapter, and transmit the most updated upgrade information to the power adapter during the process that the mobile terminal is electrically coupled to the power adapter. The power adapter is thus ungraded to solve the problem that the power adapter is difficult to upgrade.

Optionally, the first sending controller 820 may be configured to convert the upgrade information into the data in accordance with UART format; transmit the data in accordance with UART format to the UART port of the processor of the power adapter through the data in the charging port.

Optionally, the first sending controller 820 may be specifically configured to convert the downloaded upgrade information into the data in the UART format through the AP of the mobile terminal 800; utilize the UART port of the AP to transmit the data in the UART format to the UART port of the processor of the power adapter through the AP of the mobile terminal 800.

Optionally, the mobile terminal 800 may further include: a communication controller configured to communicate with the processor of the power adapter through the first data transmission link to determine whether the firmware of the processor of the power adapter needs to be upgraded, wherein the first data transmission link connects the MCU of the mobile terminal 800 and the charging port. The first sending controller 820 may be specifically configured to switch to the second data transmission link through the USB switch in the mobile terminal when determining that the firmware of the processor of the power adapter needs to be upgraded, and utilize the UART port of the AP to transmit the data in the UART format to the UART port of the processor of the power adapter through the second data transmission link, wherein the second data transmission link connects the UART port of the AP and the charging port.

Optionally, the mobile terminal 800 may further include: a judge controller configured to determine whether the power supply device plugged in is the power adapter through the third data transmission link, wherein the third data transmission link connects the USB port of the AP and the charging port. The communication controller may be specifically configured to switch to the first data transmission link through the USB switch in the mobile terminal when the MCU of the mobile terminal determines that the power supply device plugged in is the power adapter to communicate with the processor of the power adapter through the MCU of the mobile terminal so as to determine whether the firmware of the processor of the power adapter needs to be upgraded.

Optionally, the upgrade information is the information downloaded from the network by the AP in the mobile terminal through the radio frequency controller.

Optionally, the mobile terminal 800 may further include: a second sending controller configured to transmit the handshake request message to the power adapter, the handshake request message being configured to enquire about the current version of the firmware of the power adapter; a receiving controller configured to receive the handshake response message fed back from the power adapter, the handshake response message including the message indicating the current version of the firmware of the power adapter; a determination controller configured to determine whether the firmware currently used by the power adapter needs to be upgraded according to the current version of the firmware of the power adapter and the latest updated version indicated by the downloaded upgrade information. The first sending controller 820 may be specifically configured to transmit the upgrade information to the processor of the power adapter when determining that the firmware currently used by the power adapter needs to be upgraded.

Optionally, the first sending controller 820 may be specifically configured to transmit the upgrade information to the processor of the power adapter through the data line in the charging port during the process that the power adapter uses the normal charging mode to charge the mobile terminal 800. The mobile terminal 800 may further include: a switch controller configured to switch from the normal charging mode to the fast charging mode after the power adapter upgrades the firmware of the power adapter according to the upgrade information, wherein the charge rate of the fast charging mode is greater than the charge rate of the normal charging mode.

Optionally, the charging port may be the USB port. The data line in the charging port is at least one of the D+ line and the D− line in the USB port.

Figure 9:
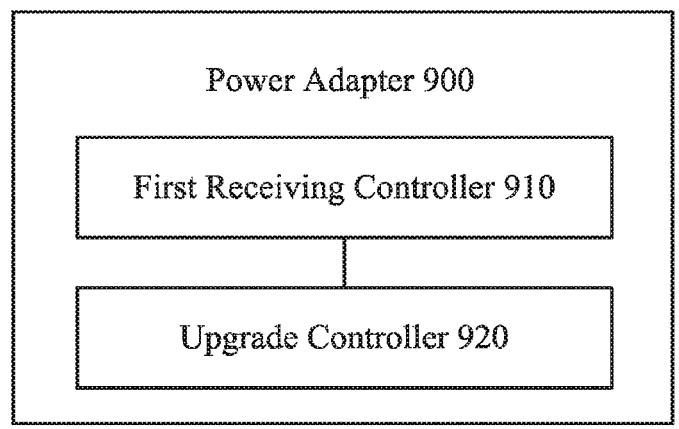
FIG. 9 is a schematic block diagram of a power adapter according to one embodiment of the present disclosure.

FIG. 9 is a schematic block diagram of a power adapter according to one embodiment of the present disclosure. The power adapter 900 in FIG. 9 includes:

A first receiving controller 910 configured to receive the upgrade information of the power adapter 900 from the mobile terminal through the data line in the charging port during the process that the power adapter 900 is electrically coupled to the mobile terminal through the charging port;

An upgrade controller 920 configured to upgrade the firmware of the power adapter 900 through the processor of the power adapter 900 according to the upgrade information.

According to the embodiment of the present disclosure, the mobile terminal is utilized to download the upgrade information of the power adapter, and transmit the most updated upgrade information to the power adapter during the process that the mobile terminal is electrically coupled to the power adapter so as to upgrade the power adapter. The problem that the power adapter is difficult to upgrade is solved.

Optionally, the first receiving controller 910 may be specifically configured to receive the data in accordance with UART format transmitted by the mobile terminal through the UART port of the processor. The data in accordance with UART format is formed by converting the upgrade information by the mobile terminal.

Optionally, the first sending controller 910 may be specifically configured to receive the data in accordance with UART format transmitted from the UART port of the AP of the mobile terminal through the UART port of the processor.

Optionally, the upgrade information may be the information downloaded from the network by the AP in the mobile terminal through the radio frequency controller.

Optionally, the power adapter 900 may further include: a second receiving controller configured to receive the handshake request message from the mobile terminal, the handshake request message being configured to enquire about the current version of the firmware of the power adapter 900; a sending controller configured to transmit the handshake response message to the mobile terminal, the handshake response message including the message indicating the current version of the firmware of the power adapter 900. The first receiving controller 910 may be specifically configured to receive the upgrade information of the power adapter 900 from the mobile terminal when the mobile terminal determines that the firmware currently used by the power adapter 900 needs to be upgraded according to the latest updated version indicated by the upgrade information.

Optionally, the first receiving controller 910 may be specifically configured to allow the power adapter 900 to receive the upgrade information of the power adapter 900 from the mobile terminal through the data line in the charging port during the process that the power adapter 900 uses the normal charging mode to charge the mobile terminal. The power adapter 900 may further include: a switch controller configured to switch the power adapter 900 from the normal charging mode to the fast charging mode after the power adapter 900 upgrades the firmware of the power adapter 900 according to the upgrade information, wherein the charge rate of the fast charging mode is greater than the charge rate of the normal charging mode.

Optionally, the charging port is the USB port. The data line in the charging port is at least one of the D+ line and the D− line in the USB port.

Figure 10:
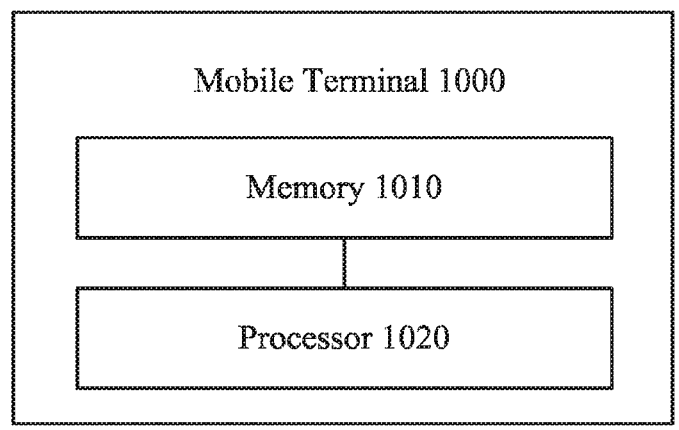
FIG. 10 is a schematic block diagram of a mobile terminal according to one embodiment of the present disclosure.

FIG. 10 is a schematic block diagram of a mobile terminal according to one embodiment of the present disclosure. A mobile terminal 1000 in FIG. 10 includes:

a memory 1010 configured to store a program;

a processor 1020 configured to execute the program, when the program is executed, the processor 1020 being configured to download the upgrade information of the power adapter, the upgrade information being configured to upgrade the firmware of the power adapter; transmit the upgrade information to the processor of the power adapter through the data line in the charging port during the process that the mobile terminal 1000 is electrically coupled to the power adapter through the charging port to facilitate the processor to upgrade the firmware of the power adapter according to the upgrade information.

In the embodiment of the present disclosure, the mobile terminal is utilized to download the upgrade information of the power adapter, and the most updated firmware update information is transmitted to the power adapter during the process that the mobile terminal is electrically coupled to the power adapter, the power adapter is thus upgraded to solve the problem that the power adapter is difficult to upgrade.

Optionally, the processor 1020 may be specifically configured to convert the upgrade information into the data in accordance with UART format; transmit the data in accordance with UART format to the UART port of the processor of the power adapter through the data line in the charging port.

Optionally, the processor 1020 includes the AP and the MCU. The AP may be specifically configured to convert the downloaded upgrade information into the data in the UART format; the UART port of the AP is utilized to transmit the data in the UART format to the UART port of the processor of the power adapter.

Optionally, the mobile terminal 1000 includes the AP and the MCU. The mobile terminal 1000 may further be configured to communicate with the processor of the power adapter through the first data transmission link to determine whether the firmware of the processor of the power adapter needs to be upgraded, wherein the first data transmission link connects the MCU of the mobile terminal 1000 and the charging port; the first data transmission link is switched to the second data transmission link through the USB switch in the mobile terminal 1000 when determining that the firmware of the processor of the power adapter needs to be upgraded; the UART port of the AP is utilized to transmit the data in the UART format to the UART port of the processor of the power adapter through the second data transmission link, wherein the second data transmission link connects the UART port of the AP and the charging port.

Optionally, the mobile terminal 1000 may further be configured to determine whether the power supply device plugged in is the power adapter through the third data transmission link, wherein the third data transmission link connects the USB port of the AP and the charging port; the USB switch in the mobile terminal 1000 is switched to the first data transmission link so that the MCU of the mobile terminal 1000 is communicated with the processor of the power adapter to determine whether the firmware of the processor of the power adapter needs to be upgraded when the MCU of the mobile terminal 1000 determines that the power supply device plugged in is the power adapter.

Optionally, the upgrade information may be the information downloaded from the network by the AP in the mobile terminal 1000 through the radio frequency controller.

Optionally, the processor 1020 may further be configured to transmit the handshake request message to the power adapter, the handshake request message is configured to enquire about the current version of the firmware of the power adapter; receive the handshake response message fed back from the power adapter, the handshake response message includes the message indicating the current version of the firmware of the power adapter; determine whether the firmware currently used by the power adapter needs to be upgraded according to the current version of the firmware of the power adapter and the latest updated version indicated by the downloaded upgrade information; transmit the upgrade information to the processor of the power adapter when determining that the firmware currently used by the power adapter needs to be upgraded.

Optionally, the processor 1020 may be specifically configured to transmit the upgrade information to the processor of the power adapter through the data line in the charging port during the process that the power adapter uses the normal charging mode to charge the mobile terminal 1000. The processor 1020 may further be configured to switch from the normal charging mode to the fast charging mode after the power adapter upgrades the firmware of the power adapter according to the upgrade information, wherein the charge rate of the fast charging mode is greater than the charge rate of the normal charging mode.

Optionally, the charging port may be the USB port. The data line in the charging port is at least one of the D+ line and the D− line in the USB port.

Figure 11:
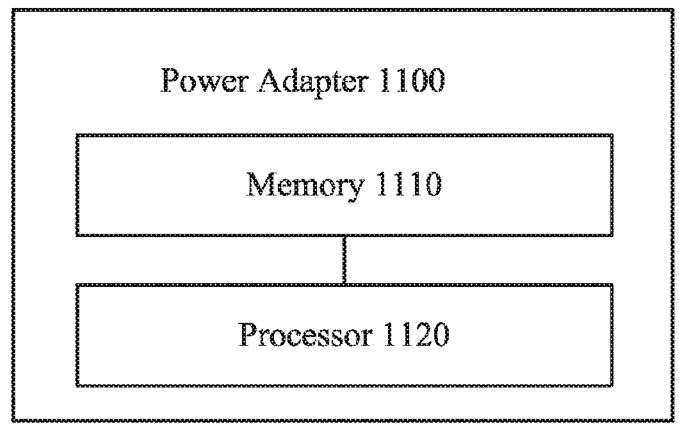
FIG. 11 is a schematic block diagram of a power adapter according to one embodiment of the present disclosure.

FIG. 11 is a schematic block diagram of a power adapter according to one embodiment of the present disclosure. A power adapter 1100 in FIG. 11 includes:

a memory 1110 configured to store a program;

a processor 1120 configured to execute the program, when the program is executed, the processor 1120 being configured to receive the upgrade information of the power adapter 1100 from the mobile terminal through the data line in the charging port during the process that the power adapter 1100 is electrically coupled to the mobile terminal through the charging port; upgrade the firmware of the power adapter 1100 according to the upgrade information.

According to the embodiment of the present disclosure, the mobile terminal is utilized to download the upgrade information of the power adapter, and the most updated firmware update information is transmitted to the power adapter during the process that the mobile terminal is electrically coupled to the power adapter, the power adapter is thus upgraded to solve the problem that the power adapter is difficult to upgrade.

Optionally, the processor 1120 may be specifically configured to receive the data in accordance with UART format transmitted by the mobile terminal through the UART port of the processor 1120. The data in accordance with UART format is formed by converting the upgrade information by the mobile terminal.

Optionally, the processor 1120 may be specifically configured to receive the data in accordance with UART format transmitted from the UART port of the AP of the mobile terminal through the UART port of the processor 1120.

Optionally, the upgrade information may be the information downloaded from the network by the AP in the mobile terminal through the radio frequency controller.

Optionally, the processor 1120 may further be configured to receive the handshake request message from the mobile terminal, the handshake request message is configured to enquire about the current version of the firmware of the power adapter 1100; transmit the handshake response message to the mobile terminal, the handshake response message includes the message indicating the current version of the firmware of the power adapter 1100; receive the upgrade information of the power adapter 1100 from the mobile terminal when the mobile terminal determines that the firmware currently used by the power adapter 1100 needs to be upgraded according to the latest updated version indicated by the upgrade information.

Optionally, the processor 1120 may be specifically configured to receive the upgrade information of the power adapter 1100 from the mobile terminal through the data line in the charging port during the process that the power adapter 1100 uses the normal charging mode to charge the mobile terminal. The processor 1120 may further be configured to switch the power adapter 1100 from the normal charging mode to the fast charging mode after the power adapter 1100 upgrades the firmware of the power adapter 1100 according to the upgrade information. The charge rate of the fast charging mode is greater than the charge rate of the normal charging mode.

Optionally, the charging port may be the USB port. The data line in the charging port is at least one of the D+ line and the D− line in the USB port.

The one having ordinary skill in the art understand that each of the controllers, algorithm, and steps described and disclosed in the embodiments of the present disclosure are realized using electronic hardware or combinations of software for computers and electronic hardware. Whether the functions run in hardware or software depends on the condition of application and design requirement for a technical plan. The one having ordinary skill in the art can use different ways to realize the function for each specific application while such realizations should not go beyond the scope of the present disclosure.

It is understood by the one having ordinary skill in the art that he/she can refer to the working processes of the system, device, and controller in the above-mentioned embodiment since the working processes of the above-mentioned system, device, and controller are basically the same. For easy description and simplicity, these working processes will not be detailed.

It is understood that the disclosed system, device, and method in the embodiments of the present disclosure can be realized with other ways. The above-mentioned embodiments are exemplary only. The division of the controllers is merely based on logical functions while other divisions exist in realization. It is possible that a plurality of controllers or components are combined or integrated in another system. It is also possible that some characteristics are omitted or skipped. On the other hand, the displayed or discussed mutual coupling, direct coupling, or communicative coupling operate through some ports, devices, or controllers whether indirectly or communicatively by ways of electrical, mechanical, or other kinds of forms.

The controllers as separating components for explanation are or are not physically separated. The controllers for display are or are not physical controllers, that is, located in one place or distributed on a plurality of network controllers. Some or all of the controllers are used according to the purposes of the embodiments.

Moreover, each of the functional controllers in each of the embodiments can be integrated in one processing controller, physically independent, or integrated in one processing controller with two or more than two controllers.

If the software function controller is realized and used and sold as a product, it can be stored in a readable storage medium in a computer. Based on this understanding, the technical plan proposed by the present disclosure can be essentially or partially realized as the form of a software product. Or, one part of the technical plan beneficial to the conventional technology can be realized as the form of a software product. The software product in the computer is stored in a storage medium, including a plurality of commands for a computational device (such as a personal computer, a server, or a network device) to run all or some of the steps disclosed by the embodiments of the present disclosure. The storage medium includes a U disk, a mobile hard disk, a read-only memory (ROM), a random access memory (RAM), a floppy disk, or other kinds of media capable of storing program codes.

The present disclosure is described in detail in accordance with the above contents with the specific preferred examples. However, this present disclosure is not limited to the specific examples. For the ordinary technical personnel of the technical field of the present disclosure, on the premise of keeping the conception of the present disclosure, the technical personnel can also make simple deductions or replacements, and all of which should be considered to belong to the protection scope of the present disclosure.

What is claimed is:

1. A method of upgrading a power adapter comprising:
   receiving upgrade information of the power adapter from a mobile terminal by the power adapter through a data line in a charging port when the power adapter is electrically coupled to the mobile terminal through the charging port; and
   upgrading firmware of the power adapter by a processor of the power adapter according to the upgrade information.

2. The method as claimed in claim 1, wherein the step that the power adapter receives the upgrade information of the power adapter from the mobile terminal through the data line in the charging port comprises:
   receiving data in accordance with a Universal Asynchronous Receiver/Transmitter (UART) format transmitted by the mobile terminal by the power adapter through a UART port of the processor, wherein the data in accordance with UART format is formed by converting the upgrade information by the mobile terminal.

3. The method as claimed in claim 1, wherein receiving the data in accordance UART format transmitted by the mobile terminal by the power adapter through the UART port of the processor comprises:
   receiving the data in accordance UART format transmitted from a UART port of an AP of the mobile terminal by the power adapter through the UART port of the processor.

4. The method as claimed in claim 1, wherein the upgrade information is information downloaded from network by the AP in the mobile terminal through a radio frequency controller.

5. The method as claimed in claim 1, further comprising:
   receiving a handshake request message from the mobile terminal by the power adapter, the handshake request message configured to obtain a current version of the firmware of the power adapter; and
   transmitting a handshake response message to the mobile terminal by the power adapter, the handshake response message including a message indicating the version of the firmware currently used by the power adapter;
   receiving the upgrade information of the power adapter from the mobile terminal by the power adapter comprising:
      receiving the upgrade information of the power adapter from the mobile terminal by the power adapter when the mobile terminal determines that the firmware currently used by the power adapter needs to be upgraded according to a latest updated version indicated by the upgrade information.

6. The method as claimed in claim 1, wherein the step that the power adapter receives the upgrade information of the power adapter from the mobile terminal through the data line in the charging port during the process that the power adapter is electrically coupled to the mobile terminal through the charging port comprises:
   receiving the upgrade information of the power adapter from the mobile terminal by the power adapter through the data line in the charging port when the power adapter uses a normal charging mode to charge the mobile terminal;
   the method further comprises:
      switching the power adapter from the normal charging mode to a fast charging mode after the power adapter upgrades the firmware of the power adapter according to the upgrade information, wherein a charge rate of the fast charging mode is greater than a charge rate of the normal charging mode.

7. The method as claimed in claim 1, wherein the charging port is a USB port, the data line in the charging port is at least one of D+ line and D− line in the USB port.

8. A mobile terminal, comprising:
   a download controller configured to download upgrade information for upgrading firmware of a power adapter; and
   a first sending controller configured to transmit the upgrade information to a processor of the power adapter through a data line in a charging port via which the mobile terminal is coupled to the power adapter;
   wherein the processor of the power adapter completes the firmware upgrade based on the received upgrade information.

9. The mobile terminal as claimed in claim 8, wherein the first sending controller is configured to convert the upgrade information into data in accordance with a Universal Asynchronous Receiver/Transmitter (UART) format and then to transmit the data in accordance with the UART format to a UART port of the processor of the power adapter through the data line in the charging port.

10. The mobile terminal as claimed in claim 8, wherein the first sending controller is configured to convert the downloaded upgrade information into the data in accordance with the UART format through an application processor (AP) of the mobile terminal, and then to utilize a UART port of the AP to transmit the data in accordance with the UART format to a UART port of the processor of the power adapter through the AP of the mobile terminal.

11. The mobile terminal as claimed in claim 8, further comprising:
a communication controller configured to communicate with the processor of the power adapter through a first data transmission link to determine whether the firmware of the processor of the power adapter needs to be upgraded, wherein the first data transmission link connects a microcontroller unit (MCU) of the mobile terminal and the charging port;
the first sending controller being configured to switch to a second data transmission link through a USB switch in the mobile terminal when it is determined that the firmware of the processor of the power adapter needs to be upgraded by the AP, and then to utilize a UART port of the AP to transmit the data in accordance with the UART format to the UART port of the processor of the power adapter through the second data transmission link, wherein the second data transmission link connects the UART port of the AP and the charging port.

12. The mobile terminal as claimed in claim 11, further comprising:
a judgment controller configured to determine whether a plugged power supply device is the power adapter through a third data transmission link, wherein the third data transmission link connects a USB port of the AP and the charging port;
the communication controller being configured to switch to the first data transmission link through the USB switch in the mobile terminal when the MCU of the mobile terminal determines that the plugged power supply device is the power adapter, and then the communication controller being configured to communicate with the processor of the power adapter through the MCU of the mobile terminal so as to determine whether the firmware of the processor of the power adapter needs to be upgraded.

13. The mobile terminal as claimed in claim 8, wherein the upgrade information is information downloaded from network by the AP in the mobile terminal through a radio frequency controller.

14. The mobile terminal as claimed in claim 8, wherein the first sending controller is configured to transmit the upgrade information to the processor of the power adapter through the data line in the charging port when the power adapter uses a normal charging mode to charge the mobile terminal, the mobile terminal further comprises:
a switch controller configured to switch the power adapter from the normal charging mode to a fast charging mode when the power adapter completes the firmware upgrade of the power adapter based on the received upgrade information, wherein a charge rate of the battery charged by the power adapter in the normal charging mode is greater than a charge rate of the battery charged by the power adapter in the fast charging mode.

15. A power adapter comprising:
a first receiving controller configured to receive upgrade information of the power adapter from a mobile terminal through a data line in a charging port when the power adapter is electrically coupled to the mobile terminal through the charging port; and
an upgrade controller configured to upgrade firmware of the power adapter through the processor of the power adapter according to the upgrade information.

16. The power adapter as claimed in claim 15, wherein the first receiving controller is configured to receive data in accordance with a Universal Asynchronous Receiver/Transmitter (UART) format transmitted by the mobile terminal through a UART port of the processor, wherein the data in accordance with UART format is formed by converting the upgrade information by the mobile terminal.

17. The power adapter as claimed in claim 15, wherein the first receiving controller is configured to receive the data in accordance with the UART format transmitted from a UART port of an application processor (AP) of the mobile terminal through the UART port of the processor.

18. The power adapter as claimed in claim 15, wherein the upgrade information is information downloaded from network by the AP in the mobile terminal through a radio frequency controller.

19. The power adapter as claimed in claim 15, wherein the power adapter further comprises:
a second receiving controller configured to receive a handshake request message from the mobile terminal, the handshake request message being configured to enquire about a current version of the firmware of the power adapter; and
a sending controller configured to transmit a handshake response message to the mobile terminal, the handshake response message including a message indicating the current version of the firmware of the power adapter;
the first receiving controller being configured to receive the upgrade information of the power adapter from the mobile terminal when the mobile terminal determines that the firmware currently used by the power adapter needs to be upgraded according to a latest updated version indicated by the upgrade information.

20. The power adapter as claimed in claim 15, wherein the first receiving controller is configured to receive the upgrade information of the power adapter from the mobile terminal by the power adapter through the data line in the charging port when the power adapter uses a normal charging mode to charge the mobile terminal;
the power adapter further comprises:
a switch controller configured to switch the power adapter from the normal charging mode to a fast charging mode when the power adapter completes the firmware upgrade of the power adapter based on the received upgrade information, wherein a charge rate of the battery charged by the power adapter in the normal charging mode is greater than a charge rate of the battery charged by the power adapter in the fast charging mode.

* * * * *